United States Patent [19]

Honigsbaum

[11] Patent Number: 4,886,221

[45] Date of Patent: Dec. 12, 1989

[54] CHARGE CONTROL APPARATUS FOR HOVERCRAFT, SPACECRAFT AND THE LIKE

[76] Inventor: Richard F. Honigsbaum, A-21 Barry Gardens, 245 Passaic Ave., Passaic, N.J. 07055

[21] Appl. No.: 138,505

[22] Filed: Dec. 24, 1987

[51] Int. Cl.$^4$ .............................................. B64D 45/02
[52] U.S. Cl. .................................. 244/1 A; 361/218; 361/220
[58] Field of Search ............... 244/1 A, 121; 361/212, 361/217, 218, 220, 216; 324/72, 72.5, 457

[56] References Cited

U.S. PATENT DOCUMENTS

| | | | |
|---|---|---|---|
| 1,757,111 | 5/1930 | Crossley | 244/1 A |
| 2,320,146 | 5/1943 | Leake | 244/1 A |
| 2,386,084 | 10/1945 | Ayres | 175/264 |
| 2,386,647 | 10/1945 | Andresen | 175/264 |
| 2,933,732 | 4/1960 | Tanner | 244/1 A |
| 3,283,210 | 11/1966 | Welsh | 317/2 |
| 3,427,504 | 2/1969 | de la Cierva | 317/2 |
| 3,802,625 | 4/1974 | Buser et al. | 361/218 |
| 3,874,616 | 4/1975 | Buser | 244/17.11 |
| 3,893,005 | 7/1975 | Corbin | 317/2 E |
| 3,986,681 | 10/1976 | Parkinson | 244/1 A |
| 4,059,846 | 11/1977 | Eisenhauer | 361/218 |
| 4,228,479 | 10/1980 | Larigaldie et al. | 361/218 |
| 4,736,906 | 4/1988 | Taillet | 244/1 A |

FOREIGN PATENT DOCUMENTS 2149749  4/1973  Fed. Rep. of Germany ..... 244/1 A

OTHER PUBLICATIONS

"Helicopter Model Studies for On-Board, Etc.", Tranbarger et al., Abstract and p. 65, Sep. 1981.
"Electrostatic Charging of the CH-53E Helicopter", Pechacek et al., Nov. 29, 1985, pp. 27–29.

Primary Examiner—Joseph F. Peters, Jr.
Assistant Examiner—Rodney Corl
Attorney, Agent, or Firm—Schechter, Brucker & Pavane

[57] ABSTRACT

A charge control apparatus for a flightcraft uses an inherent droplet charging mechanism to remove unwanted charge from the distal portion of a reference body mechanically connected to, and external to the craft, and a driven ion attachment mechanism to adjust the potential of the craft to that of the reference.

10 Claims, 4 Drawing Sheets

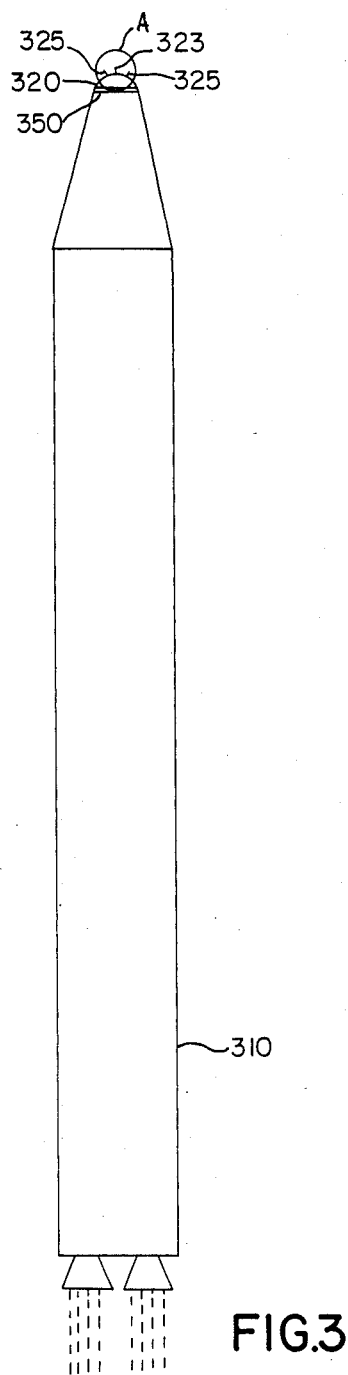
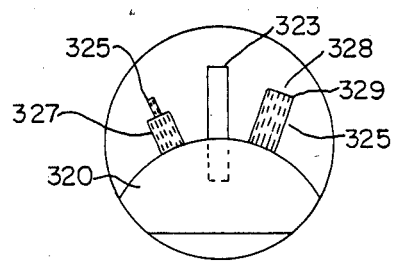
FIG. 3A
FIG. 3

CHARGE CONTROL APPARATUS FOR HOVERCRAFT, SPACECRAFT AND THE LIKE

BACKGROUND OF THE INVENTION

1. Field of the Invention

This invention relates to flightcraft charge control apparatii and more particularly to charge control apparatii that have electrically isolated second bodies that establish a potential reference for charge removal from the craft.

2. Prior Art

Static electricity has compromised manned flight from the days of hydrogen filled balloons to the present.

In those early days, the primary concern was that of spark ignition of the balloon gases. Later, when aircraft radio was introduced, communication by this means was compromised by static-electricity-produced interference. The ignition problem was addressed by substituting helium for hydrogen, and the communication problem by improved communication equipment, the matter of static electricity and its control surviving unresolved.

Static electricity now further compromises manned flight, particularly that of hovercraft, spacecraft, and stealthcraft.

For hovercraft, the primary concern is that of electrocution of ground personnel. Tests of CH-53E helicopters over sandy terrain confirm charging rates of 70 microamperes and potentials to ground of 140 kilovolts. Extrapolation suggests that first contact with the craft by ground crews can be contact with 400 kilovolts!

For spacecraft the primary concern is lighting. Spacecraft launch paths parallel cloud-to-ground lightning paths, and charged craft can initiate the stroke and change the lightning path to one that includes the craft.

For stealthcraft the primary concern is that of detection. Clear air testing of CH-53E helicopters confirms charging rates quite capable of producing radio noise. Stealthcraft flying under similar conditions can be expected to produce the same detectable signatures.

The helicopter test data was taken from (U.S.) Naval Research Laboratories Memorandum Report Number 5676, *Electrostatic Charging of the CH-53E Helicopter*, Pechacek et al. This report also makes the very important point that the key to flightcraft charge control is a charge reference uncompromised by the electrical isolation of flight.

Tranbarger et al attempt this in *Helicopter Model Studies For On-Board Electrostatic Sensors* prepared for the U.S. Army Research and Technology Laboratories by Southwest Research Institute, San Antonio, Tex. These studies resulted in an excellent bibliography but, unfortunately, no viable charge reference.

Buser, U.S. Pat. No. 3,874,616, and de la Cierva, U.S. Pat. No. 3,427,504 use as reference surface charge density at a particular point on a helicopter, and sample this with a field mill. While surface charge measurements at an arbitrary point on an electrically isolated conducting sphere suffice to accurately predict the potential of that sphere with respect to infinity, they are less than satisfactory for predicting the potential difference between a hovering helicopter and ground. Tranbarger recognizes this and attempts to refine prediction by measuring surface charge density at additional points, correcting for craft altitude, and adjusting for the charge density of the cloud surrounding the craft. While enough such measurements could conceivably lead to a satisfactory prediction of the potential of a bare helicopter with respect to a well defined ground plane, prediction is sorely compromised when, for example, the "ground plane" is a crew member attempting hook-up to the craft from atop a load, or when most of the charge expected to be sampled on the craft itself has been attracted to an external load by the ground plane.

Ayres, U.S. Pat. No. 2,386,084, and Andresen, U.S. Pat. No. 2,386,647, use external elements to sense the potential of the craft. Their arrangements are less than satisfactory, however, because both the craft and the "sensors" are exposed to the same charging environment, with the result that both can be elevated to the same undesirable potential without invoking any mechanism to remedy the condition.

While no sensors or references suitable for flightcraft charge control are known from the prior art, a multitude of arrangements for removing charge from a flying craft are known. Charge removal by corona discharge is, for example, practiced passively by Leake, U.S. Pat. No. 2,320,146, and actively by de la Cierva, U.S. Pat. No. 3,427,504, and Parkinson, U.S. Pat. No. 3,986,681. The Tranbarger study also proposes charge removal by this means, but, like this invention, with the corona electrodes disposed in the engine exhaust stream.

Ayres, U.S. Pat. No. 2,386,084, and Welsh, U.S. Pat. No. 3,283,210, use droplets to remove charge from the craft itself, as does one embodiment of the present invention, but do not suggest using droplets to maintain a reference body at the desired potential.

Other prior-art charge removal arrangements include charge capture (Andresen, U.S. Pat. No. 2,386,647) and grounding. Examples of the latter include Crossley, U.S. Pat. No. 1,757,111, Corbin, U.S. Pat. No. 3,893,005, and, of course, conventional aircraft, where charge is leaked to ground via tires, etc. upon landing.

SUMMARY OF THE INVENTION

This invention employs a second body that serves as a reference potential for the flightcraft and is maintained at the desired potential by an inherent charge control means, and to which the potential of the craft is adjusted by a driven charge control means. This desired potential is different for each class of flightcraft for which the invention is intended.

For hovercraft working loads on the ground, ground crews are obviously at risk unless the craft is at earth potential.

For spacecraft launched from earth and approaching charged clouds, the probability of lightning strike is increased because engine exhause tends to maintain these craft at earth potential so that they become prime targets for cloud discharge unless the potential of the craft is adjusted toward that of the clouds as the former approaches the latter.

For stealthcraft, missions are compromised when craft charging mechanisms elevate these craft to corona potentials and the electromagnetic signature of the discharge reveals position.

In the preferred embodiments, this second body, electrically insulated from, but mechanically connected to the craft is maintained at the desired potential by droplets that are charged by the well known electrostatic mechanism of contact electrification, and in such a way that charges that would otherwise unfavorably alter this potential are carried off by the droplets. This charge removal is inherent in the sense that droplets are charged by the electrostatic fields external to the second body and its droplet forming appendages so that charge removal stops when that body is at the desired potential that, as explained, is different for each of the kinds of flightcraft for which this invention is intended.

In this invention, these different desired potential levels are attained as a natural consequence of positioning these second bodies and their droplet forming appendages outside the electrical envelope of the craft such that droplets are charged and released from a portion of that body distal with respect to the craft, but proximal with respect to the earth for hovercraft, and the charged clouds for the spacecraft.

These second bodies then become references for the driven charge removal mechanisms that serve the various craft themselves, and are actuated by the potential differences between the second bodies and their respective craft. These mechanisms include the familiar and very effective ion attachment mechanisms preferred here in which ions produced by corona discharge electrodes disposed in the engine exhaust streams become attached to exhaust particles and are carried off thereby. While these mechanisms can be arranged in such a way as to minimize externally detectable corona signatures, the preferred alternative when the risk of detection from these signatures is unacceptable is charge removal by driven spray charging mechanisms.

These and other features of this invention are more fully described with reference to the drawings.

BRIEF DESCRIPTION OF THE DRAWINGS

In the drawings:

FIG. 3 is a diagrammatic representation of a spacecraft having a charge control apparatus in accordance with this invention;

FIG. 3A is an exploded view of part A of FIG. 3;

DETAILED DESCRIPTION OF THE PREFERRED EMBODIMENTS

Figure 1:
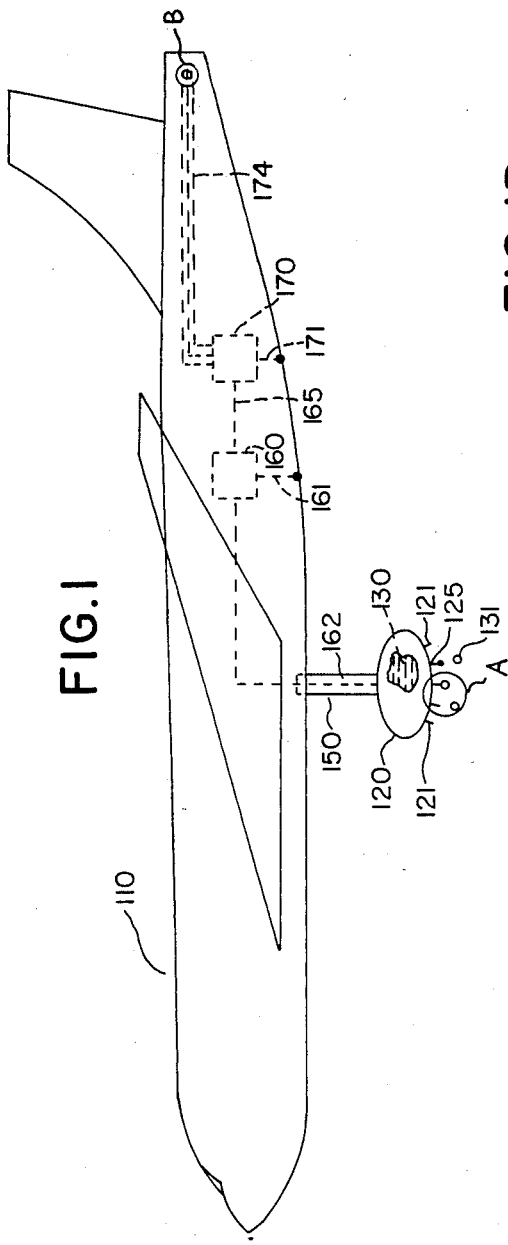
FIG. 1 is a diagrammatic representation of the features of this invention.
Figure 1B:
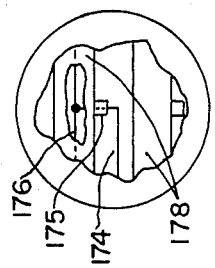
FIGS. 1A and 1B are exploded views of designated parts A and B, respectively, of FIG. 1.
Figure 1A:
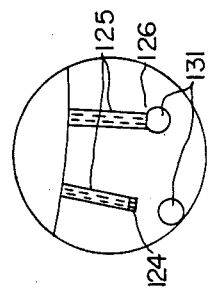

FIG. 1 illustrates the new and novel features of this invention common to more than one of the kinds of flightcraft for which it is intended, these features being shown in FIG. 1 using an airplane for purposes of illustration. As will be clear later herein, this invention involves interaction amongst objects ranging in size from intercontinental flightcraft to capillary tubing, the relative positions of which, like the artifacts shown on a map, are at least as important as the objects themselves, and so, like those map features, best illustrated in a common drawing. To accommodate this, some of these objects are shown out of scale in this and the other drawings and so described where applicable, while others, familiar from the prior art, are included by description only.

The craft of FIG. 1, a conventional aircraft 110, becomes electrically isolated by flight, and has a skin that is electrically conducting in the electrostatic sense (or can be made so by the application of a suitable point) so that, for purposes of this invention, it is a first electrically isolated conducting body, so designated to distinguish it from a substantially smaller second body 120 having the same electrical characteristics and connected to it by insulating strut 150. These two electrically isolated conducting bodies, conveniently called first body 110 and second body 120, interact with each other and with their respective charge control mechanisms to drive the potential of the craft towards the desired condition of neutrality with respect to its surroundings. In this embodiment, second body 120 also serves as a reservoir for the electrostatically conductive droplet fluid 130 that removes charge from that body, and is sized accordingly. In other embodiments, other siting and second body sizing may be preferred. Obvious details, such as the fluid replenishment, monitoring, and flow control hardware have been omitted from the drawing for reasons explained earlier herein.

In this embodiment, droplet fluid 130 exits second body 120 via one or more electrically conductive capillaries 125 that extend beyond the portion of the second body 120 distal with respect to first body 110, and form droplets 131 at the distal ends 126 of capillaries 125. These droplets, charged by the electrical field in which they form, depart capillaries 125 carrying a portion of the excess charge on second body 120.

This droplet charging and the resulting charge removal is best explained by assuming initially that bodies 110 and 120 both carry excess charge of the same sign, and that both are at the same electrostatic potential. When so charged, the charges on one body will repel those on the other, so that the excess charge on the second body will flee to the droplets and be carried off thereby. The result is a potential difference between the bodies, that of the second body shifting toward the desired level of neutrality with respect to its surroundings.

The potential of the first body is then adjusted to that of the second by a first body charge removal mechanism that is responsive to the potential difference between the bodies, the process continuing until the potential of both bodies approximates that of the surroundings, and the electric field that charges the droplets vanishes. When the bodies carry charges of opposite sign, the polarity of the first body is brought to that of the second by the first body charge removal mechanism, and then adjustment of the potential of both bodies toward that of their surroundings proceeds as explained.

In the embodiment of FIG. 1, the potential of each of the bodies is fed to controller 160, the output of which activates the charge removal mechanism for the first body via a signal transmitted by lead 165, and in such a way that the potential of the first body is driven toward that of the second. Controller 160, shown housed within first body 110, senses the potential of that body by means of lead 161 electrically connected to the skin of the craft, or alternately by equipment ground, and that of second body 120 via lead 162, shown housed in insulating strut 150 in FIG. 1. Because the electrical isolation of the second body can be compromised by charge leakage to it from the first, the input circuitry of controller 160 also preferably includes a buffering amplifier the input impedance of which is high enough so that charge leakage to the second body via the circuitry is small when compared to the rate at which charge is removed from that body by the droplets.

The mechanism for removing charge from the first body that is preferred for most of the embodiments of this invention is the ion attachment mechanism known from the prior art. In the particular arrangement of that mechanism preferred here, a collection of grounded metallic ducts 178 is introduced into the engine exhaust path in such a way that each duct carries a portion of the exhaust. Each of these ducts, one of which is shown partially cut away, houses a coaxial corona wire 176 electrically isolated from its duct by insulating support means (not shown) and connected to one output terminal of high voltage power supply 170 by an insulated lead 174 that enters the duct through insulating bushing 175. The high voltage power supply is also connected to the ducts via lead 171 and/or equipment ground so that, when high voltage power supply 170 is activated by a signal from controller 160 via lead 165, ions of the required polarity will form about corona wire 176, attach themselves to exhaust particulate, aerosols, condensate, etc., and be carried off thereby.

Effective charge control implies charge removal at a rate matching that at which charge is accumulated (when the craft is in equilibrium with its surroundings), and on the basis of extrapolation of the tests on the CH-53E helicopters cited earlier herein, rates covering some two orders of magnitude can be expected, and equipment that can remove charge at the highest rates can be expected to overshoot and produce a string of charge reversals when rates are low, unless special means are introduced to accommodate these extremes. Accommodation mechanisms familiar from the prior art include pulsing, current limiting, and deactivating some of the corona wires 176, the hardware and circuitry for which are well known and omitted from the drawings as are the details of the buffering amplifier mentioned earlier herein. In the preferred embodiment, one or more of these accommodation mechanisms is activated when the potential difference between the first and second bodies falls below a predetermined level.

This embodiment also includes a "back-up" charge removal mechanism that becomes operative when droplet formation stops, say because the droplet fluid reservoir is punctured or runs dry. This "back-up" mechanism is corona discharge, the capillaries 125 serving as corona needles, and is made more effective by tipping one or more of the capillaries 125 with radioactive material 124, using material familiar from smoke detectors or photographer's "anti-static" brushes. In other embodiments, a set of corona needles 121, dedicated to the purpose, and radioactively tipped or otherwise, may be preferred, either as "back-up" for, or, where cruder levels of charge control are acceptable, in lieu of the capillaries.

Figure 2:
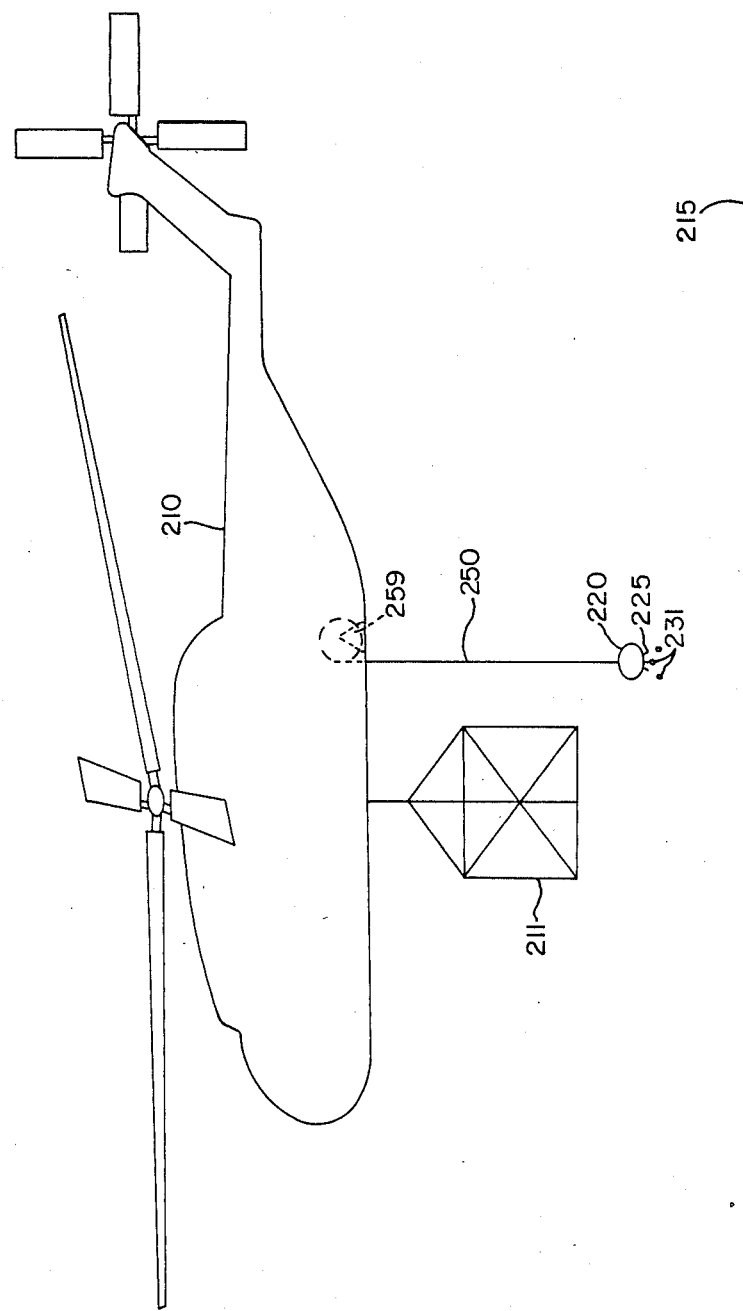
FIG. 2 is a diagrammatic representation of a hovercraft having a charge control apparatus in accordance with this invention.

The embodiment of FIG. 2 is intended for hovercraft such as the helicopter shown. Charge control for such a craft is complicated by the need to match the potential of the craft to that of the earth to protect ground crews, this despite a distinctly different equilibrium potential with respect to its surroundings for the craft itself, and the electrical masking of the second body that results when cargo is suspended below that body.

In this figure, first body 210 is drawn to represent a helicopter, external cargo is designated 211, and second body 220 is fixed to the end of the conductor of insulated cable 250 and in such a way that second body 220 can be lowered to a position below cargo 211 as shown, say by winch 259, while maintaining electrical connection to the controller corresponding to 160 of FIG. 1. The controller for the embodiment of FIG. 2, as well as the other elements needed to effect control of the net charge on first body 210, have been described in connection with FIG. 1 and are considered no further here.

When second body 220 is positioned as shown, capillaries 225 and droplets 231 are on the portion of second body 220 distal with respect to both the craft 210 and its external cargo 211, but proximal with respect to a third electrically isolated conducting body 215, the earth, so that as the craft approaches the earth, charges of polarity opposite to that of the earth are drawn to the droplets and removed thereby, the potential of the second body thus approaching that of the earth and, by virtue of the charge removal mechanism for the first body, so too the craft. (Potential of an in-flight refueling tanker can be brought to that of the craft to be refueled by a similar arrangement.) Desirably, the second body 220 should be positioned at the stagnation point of any dust cloud generated by craft 210 so that second body 220 is not charged thereby. To maintain the position of the second body 220, the second body may be weighted and/or shaped to reduce sway.

In normal flight, second body 220 will, of course, be raised to a position closer to the craft but distal with respect to any portion of the craft or its load, and in this position will serve craft 210 in substantially the same way that second body 120 serves the craft of FIG. 1.

This "distal" caveat also applies to other kinds of craft as well. If, for example, second body 220 were to be positioned between the hovercraft and its electrostatically conductive and connected load 211, (of between the craft of FIG. 1 and, say, externally mounted fuel tanks) the droplet charging field would be that between the craft and its external load, an essentially zero electric field regardless of the potential imbalance between the craft and its surroundings. The charge control apparatii of this invention would also be ineffective if droplet charging were to be effected on a portion of the second body proximal with respect to the first because once the driven charge remove mechanism for the first body adjusted the potential of that body to the potential of the second, the droplet charging field for the second body would again vanish.

The charge control apparatus of FIG. 2 adjusts the potential of the craft to that of a third electrically isolated conducting body (the earth) instead of that of its surroundings because droplets are charged on the portion of the second body distal with respect to the first body but proximal with respect to the third, and the arrangement inherently accommodates "ground plane irregularities" as diverse as ground crews, vehicles, buildings and trees, an accommodation that has yet to be demonstrated for charge control apparatii that sample surface charge density of the craft, the volume charge density of its surroundings, and/or the altitude of the craft, and use one or more of these parameters to synthesize a reference for a charge control scheme.

The embodiment of FIG. 3 is a flightcraft having an orientation and flightpath that, at least initially, are radially outward with respect to the earth. Such craft, which may be spacecraft themselves, or carry such craft as payload, are at substantially greater risk from lightning because their axes are aligned with cloud-earth electrical discharge paths, and because their engine exhausts, behaving in some respects like the droplets leaving the portion of the second body of FIG. 2 nearest the earth, remove charge of polarity opposite that of the earth, so that these craft become in effect extra-long high impedance lightning rods the tips of which are the craft themselves. The unfortunate consequences of this are now well known.

Much of this lightning risk can be eliminated by adjusting the potential of the craft to that of the clouds as the former approach the latter.

These craft travel at velocities at which aerodynamic drag is an important consideration, and to accommodate this both the second body and the insulating strut of this embodiment have been incorporated into the familiar aerodynamic envelope of the craft itself, so that the main portion of the craft becomes first body 310, the tip of the nosepiece second body 320, and the mechanical coupling between these two insulating section 350. Charge is removed from the portion of second body 320 proximal with respect to the clouds by capillaries 325 and/or charge removal rockets, one of which, 323, is shown. In this embodiment, the capillaries are bathed in a counterflowing stream to accommodate droplet charging and removal in the direction of flight despite motion-induced airflow over these capillaries in the opposite direction.

Referring to the detail portion of FIG. 3, the left capillary 325 is fitted over a concentric sleeve 327 short enough to accommodate charging, and the counterflow fluid, gaseous fuel or oxidant bled from the engine or its supply tanks, or air supplied by a compressor or accumulator, is introduced into the space between the sleeve and the capillary by a means not shown. The right hand capillary 325 is itself a pair of concentric tubes 328, 329, the counterflow fluid exiting the bore of the inner tube 328, and the droplet fluid from between the tubes. (This flow arrangement is similar to that of the inner pair of tubes 483 and 485 of FIG. 4 and is covered in greater detail in the description of that figure.)

Because the flight times of the craft of this embodiment are short, and the lightning-susceptible portions of those flights even shorter, charge can also or alternately be removed from second body 320 by the forward-exiting exhaust stream from one or more second body charge removal rockets, one of which, 323, is shown. Because these charge removal rockets produce a thrust in opposition to that of the main engines of the craft, these rockets are preferably "doped" with cesium and particulate to enhance charge removal capability for a given level of thrust, and "burned" for the shortest time consistent with expected charge removal.

In describing this embodiment, no mention has been made of the controller corresponding to 160 of FIG. 1 and the high voltage power supply, etc. needed to practice this invention. These features were described with respect to FIG. 1 and, despite omission from FIG. 3, are also assumed present and operative here.

Figures 4, 4A:
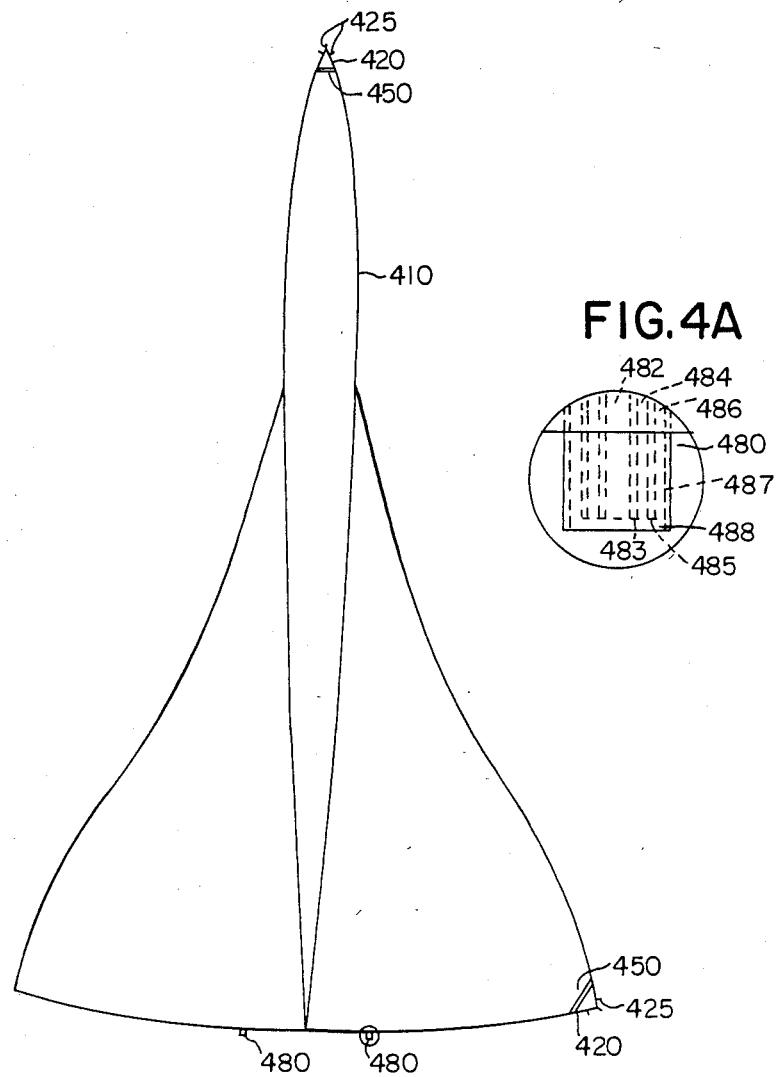
FIG. 4 is a diagrammatic representation of a stealthcraft having a charge control apparatus in accordance with this invention and FIG. 4A is an exploded view of a designated part of FIG. 4.

The embodiment of FIG. 4 is a stealthcraft, shown in the drawing as a delta-wing configuration. Because aerodynamics and stealth are both best served when the second body is a part of the aerodynamic envelope of the craft, second body 420 is preferably the tip of the nose or a wing of the craft, electrically isolated from the bulk of the craft that serves as first body 410 by an insulating section 450. Here too, elements needed to practice this invention and familiar from the drawings and descriptions of the previous embodiments but omitted from this drawing and the description thereof are, of course, a part of this embodiment as well.

The bodies 410 and 420 of this embodiment are electrically conductive in the electrostatic sense as are the corresponding bodies of the other embodiments as well, a necessary condition if the concepts of potential, potential difference, charge migration, and charge control as used herein are to have any meaning. Because bodies that are conductive in the conventional sense are usually good radar reflectors, it is important to recognize that conductivity levels that minimize radar reflection are well above those that make the first and second bodies of this invention electrically conductive in the electrostatic sense, and that radar cross-section is not enhanced by charge control in accordance with this invention.

Stealth, however, can be compromised by the electromagnetic signature of corona discharge, and there is little to be gained (with respect to stealth) when signatures that result from stealthcraft charging are replaced by those produced by the charge control apparatus. When corona-based first body charge removal mechanisms introduce unacceptable risk, spray charging mechanisms are the preferred alternatives.

The spray charging nozzles 480 in the drawing are one such arrangement, very similar to the inherent charging arrangement 328, 329 of FIG. 3, but converted from an inherent arrangement to a driven one by the addition of a charging electrode 487. Other spray charging arrangements less suited to this application are described in the literature on paint and insecticide spraying.

Referring to the enlarged portion of FIG. 4, the droplet fluid path 484 is the space between the innermost tube 483 and the center tube 485 concentric with it. The air passages through the nozzle are the bore 482 of tube 483, and the space 486 between the center tube 485 and the tubular charging electrode 487 concentric with the other two tubes. Electrically, each of the tubes is a conductor and the inner pair are connected together but insulated from the outer tube 487, so that an electric field can be impressed upon the droplet charging region 488 by a controller-high voltage power supply arrangement similar to that of FIG. 1.

This droplet charging region 488 is shielded from external fields by conducting charging electrode 487 and dominated by the field impressed by the high voltage power supply so that charging is "driven" (with respect to droplet charge density and sign) by the charge control circuitry rather than an external field such as the one that "inherently" charges the droplet fluid exiting capillaries 425. Droplet charging in nozzle 480 is also relatively insensitive to the cloud of previously charged droplets exiting that nozzle because the charging field has a dominant radial component, while that from the cloud of charged particles dominates axially.

The charging field within nozzle 480 is impressed between concentric tubes and therefore predominantly radial, and if droplet charging is to be effective, droplets must exit the nozzle fluid passage radially but be carried off axially if charge is to be removed from the craft instead of merely being transferred from the droplet portion of the nozzle to the charging electrode. This droplet movement is effected by the airflow within the nozzle, the air for which is bled from the engines as is the air that may be needed to provide a counterflow stream for capillaries 425, or, because the airflow through the nozzle is in the same general direction as that over the craft, by disposing a suitably modified version of nozzle 480 in the craft airstream.

The air passages through the nozzles are the intertube space 486 and the inner tube bore 482, the latter having a constant cross-section and the former a taper, so that air velocity on the radially outward side of the forming droplets is greater than that on the side radially inward. As a result, and in accordance with the well known Bernoulli Equation, the droplets extend radially during formation and charging. After release, they are carried off axially by the air stream because the forces on the droplets due to the air stream dominate over those due to the impressed field. Droplet impingement upon charging electrode 487 is minimized by limiting the axial extension of that electrode with respect to the inner elements of the nozzle.

This embodiment uses droplets to remove charge from both bodies, and the electrical requirements for the droplet fluids for both, conductivity high enoughs so that charges can migrate to the distal portion of a given droplet in the limited time during which the droplet is in electrical contact with its capillary or nozzle, is the same. Droplet size limitations are different, however, because the strong charging field impressed by the high voltage power supply charges more effectively, and thus accommodates smaller droplets than does the normally weaker "inherent" field surrounding the capillaries.

The class of fluids that can form suitably charged droplets, or can be made so by "doping", is large, but practical considerations favor fluids readily available where flightcraft are serviced, typically fuels, lubricants, hydraulic fluids, and water, "doped" as necessary to adjust conductivity, viscosity, freezing point, etc., and amongst these, water is preferred unless one of these other flightcraft fluids will serve unmodified.

When water is the fluid of choice, droplets must not only be large enough for effective charging by the mechanisms explained earlier herein, but must also be large enough so that these mechanisms dominate over that of ballo-charging (the mechanism said to be the cause of charge build-up and the resulting explosions when cargo compartments of supertankers are hosed down). To assure satisfactory operation, water droplets for the driven charging mechanism are preferably at least as large as those in a fine rain, and those for the inherent charging mechanism at least as large as those in an ordinary light rain. Alternate fluids will, of course, impose their own restrictions.

The parameters that determine average droplet size include capillary bore, fluid viscosity, flow rate, surface tension, and density. The quantity of charge that is carried off can be calculated from the droplet dimension, its shape at the time it separates from the capillary and the local electric field intensity, and this, combined with experimental data such as the helicopter tests mentioned earlier herein, can be used as a basis for setting droplet separation rates, droplet flow rates, reservoir sizes, etc., and thus a charge control apparatus for the flightcraft to be served by this invention. In setting these rates, it is important to recognize that charge collecting devices such as propellers, fans, rotors, etc., as well as polarity-selective charge release devices such as engines are electrically connected to the first bodies (which are, of course, the craft), but electrically isolated from the second.

Four embodiments of this invention have been described, the first a general embodiment disclosing the new and novel features of this invention, the others the ways in which this invention is applied to hovercraft, spacecraft, and stealthcraft respectively. Details of application to flightcraft not specifically addressed herein can be deduced from those that are.

For each of these embodiments, the second body charge removal medium of choice is an electrically conductive liquid. As the description of the charge removal rocket 323 of FIG. 3 makes clear, however, other media can also serve. When that medium is a particulate, triboelectric charging must be addressed, say by bathing the particulate in a conducting fluid. For the charge removal rockets, gases heated to conducting temperatures serve this function conveniently. Where temperatures approach ambient, however, conductive liquids may be required, and where so there is little if anything to be gained by adding particulate.

In these descriptions, charge control has been described on the basis that charge is conserved, and that charges of the required polarity can be removed to effect control. Actually, however, droplets described as carrying off positive charge are those that have left some of their free electrons behind.

I claim:

1. A charge control apparatus for adjusting the potential of a first electrically isolated conducting body to that of a portion of its surroundings, comprising;

a second electrically conducting body mechanically connectible to said first body in electrical isolation therefrom, said second body being positioned with its portion distal with respect to said first body proximal to said portion of said surroundings;

means for inherently removing charge from said distal portion of said second body to adjust the potential of said second body to the potential of said portion of said surroundings;

means for sensing the potential difference between said first and said second bodies; and means for driving the potential of said first body toward that of said second body.

2. The charge control apparatus of claim 1, wherein said charge removing means comprises a capillary secured to said second body.

3. The charge control apparatus of claim 1, wherein said charge removing means comprises a passive corona element.

4. The charge control apparatus of claim 1, wherein said charge removing means comprises a radioactive tip.

5. The charge control apparatus of claim 1, wherein said charge removing means comprises a charge removal rocket.

6. The charge control apparatus of claim 1, wherein said portion of said surroundings comprises a third body electrically isolated from said first and second bodies, and further comprising means for moving said second body to a position where it is responsive to the potential of said third body.

7. The charge control apparatus of claim 1, wherein said second body comprises an electrically isolated portion of the aerodynamic envelope of said first body.

8. The charge control apparatus of claim 1, wherein said driving means comprises an active corona element.

9. The charge control apparatus of claim 1, wherein said driving means comprises a spray charging nozzle.

10. The charge control apparatus of claim 9, wherein said spray charging nozzle comprises three fluid passages defined by three conducting concentric tubes, the bore of the inner tube defining a first gaseous fluid passage, the inner pair of tubes connected together electrically and defining the spray fluid passage, and the outer tube electrically insulated from and extending in the downstream direction beyond the inner pair of tubes and combining with the middle tube to define a second gaseous fluid passage in which the gaseous fluid velocity at the exit portion of said spray fluid passage is greater than the gaseous fluid velocity at the corresponding point in said first gaseous fluid passage.

* * * * *